(12) United States Patent
Yokoyama et al.

(10) Patent No.: US 11,495,373 B2
(45) Date of Patent: Nov. 8, 2022

(54) GROMMET

(71) Applicant: Yazaki Corporation, Tokyo (JP)

(72) Inventors: Satoshi Yokoyama, Aichi (JP); Masayoshi Ogawa, Aichi (JP); Shota Kinoshita, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/111,863

(22) Filed: Dec. 4, 2020

(65) Prior Publication Data

US 2021/0174993 A1 Jun. 10, 2021

(30) Foreign Application Priority Data

Dec. 5, 2019 (JP) .............................. JP2019-220122

(51) Int. Cl.
*B60R 16/02* (2006.01)
*H01B 17/58* (2006.01)

(52) U.S. Cl.
CPC ....... *H01B 17/583* (2013.01); *B60R 16/0222* (2013.01)

(58) Field of Classification Search
CPC ............ B60R 16/0207; B60R 16/0215; B60R 16/222; H02G 3/22; H01B 17/583
See application file for complete search history.

(56) References Cited

U.S. PATENT DOCUMENTS

| 2002/0036098 A1 | 3/2002 | Okuhara et al. |
| 2003/0015339 A1 | 1/2003 | Sato |
| 2011/0061897 A1 | 3/2011 | Okuhara et al. |
| 2011/0198110 A1 | 8/2011 | Fujita |
| 2012/0211262 A1 | 8/2012 | Agusa |
| 2014/0325790 A1 | 11/2014 | Watanabe et al. |

FOREIGN PATENT DOCUMENTS

| EP | 1190913 A2 | | 3/2002 | |
| EP | 2276134 A1 | | 1/2011 | |
| JP | H09292061 | * | 4/1996 | ............ B60R 16/02 |
| JP | 9-82161 A | | 3/1997 | |
| JP | H09147649 | * | 6/1997 | ............ B60R 16/02 |
| JP | H09289724 A | * | 11/1997 | ............ B60R 16/02 |
| JP | H09289725 A | * | 11/1997 | ............ B60R 16/02 |
| JP | 2003-32858 A | | 1/2003 | |
| JP | 2009189099 | * | 8/2009 | ............ H01B 17/58 |
| JP | 2011-167046 A | | 8/2011 | |
| JP | 2011-223757 A | | 11/2011 | |
| JP | 2014-57449 A | | 3/2014 | |
| WO | 2013/111546 A1 | | 8/2013 | |

* cited by examiner

*Primary Examiner* — Paresh Paghadal
(74) *Attorney, Agent, or Firm* — Sughrue Mion, PLLC

(57) ABSTRACT

A grommet includes a tapered barrel part and a tape winding spatula part. The tapered barrel part includes a large diameter cylindrical portion, a small diameter cylindrical portion, and an elastic deformation portion disposed between the large diameter cylindrical portion and the small diameter cylindrical portion. A fitting groove to be fitted in a through hole of a panel, is formed on the large diameter cylindrical portion. A thick walled portion is formed on an inner side of the elastic deformation portion. The tape winding spatula part is connected to the small diameter cylindrical portion and holds a wire harness passed through therein.

3 Claims, 3 Drawing Sheets

FIG. 3A

A. EMBODIMENT (THICK WALLED)

| WHETHER LUBRICANT IS APPLIED | LUBRICANT IS NOT APPLIED | LUBRICANT IS APPLIED |
|---|---|---|
| INSERTION FORCE | 63.6N | 45.4N |
|  | 72.1N | 47.2N |
|  | 68.9N | 32.7N |
| HOLDING FORCE | 162.5N | 164.5N |
|  | 159.8N | 161.2N |
|  | 163.4N | 163.8N |

N: LOAD

FIG. 3B

B. COMPARATIVE EXAMPLE
(THICK WALLED PORTION IS NOT INCLUDED)

| WHETHER LUBRICANT IS APPLIED | LUBRICANT IS NOT APPLIED | LUBRICANT IS APPLIED |
|---|---|---|
| INSERTION FORCE | 104.4N | 43.7N |
|  | 80.4N | 38.6N |
|  | 101.4N | 45.9N |
| HOLDING FORCE | 158.6N | 156.8N |
|  | 156.4N | 154.9N |
|  | 157.2N | 155.3N |

N: LOAD

GROMMET

CROSS-REFERENCE TO RELATED APPLICATION

The present application is based on, and claims priority from Japanese Patent Application No. 2019-220122, filed on Dec. 5, 2019, the entire contents of which are incorporated herein by reference.

TECHNICAL FIELD

The disclosure relates to a grommet.

BACKGROUND

A conventional grommet is disclosed in JP 2011-223757. The grommet includes an electric wire fixing part, an annular vehicle body panel fitting part, and a tape winding spatula. A wire harness is made pass through an inside of the electric wire fixing part. The vehicle body panel fitting part has a locking groove to be fitted in a fitting hole of a vehicle body panel. The tape winding spatula is provided at a position apart from the electric wire fixing part. An elastic deformation part being a thin part is provided between the tape winding spatula and the vehicle body panel fitting part. The grommet can be fitted in the fitting hole of the vehicle body panel by pulling the tape winding spatula to elongate the elastic deformation part. The wire harness is held to the tape winding spatula by winding a tape around the tape winding spatula before the grommet is fitted to the vehicle body panel.

SUMMARY

However, in the conventional grommet, when the grommet is mounted to the vehicle body panel, it is difficult to insert the grommet into the fitting hole of the vehicle body panel due to the elongation of the elastic deformation part.

The disclosure has been made in view of such a conventional problem, and it is an object of the disclosure to provide a grommet which can be easily inserted by suppressing elongation of an elastic deformation part when the grommet is inserted into a through hole of a panel to be mounted to the panel, and can improve a holding force by suppressing deformation of the elastic deformation part after the grommet is mounted to the panel.

According to an embodiment, there is provided a grommet including: a tapered barrel part including a large diameter cylindrical portion, a small diameter cylindrical portion, and an elastic deformation portion disposed between the large diameter cylindrical portion and the small diameter cylindrical portion; wherein a fitting groove to be fitted in a through hole of a panel, is formed on the large diameter cylindrical portion, and wherein a thick walled portion is formed on an inner side of the elastic deformation portion; and a tape winding spatula part connected to the small diameter cylindrical portion and holding a wire harness passed through therein.

It is preferred that the thick walled portion is formed from the inner side of the elastic deformation portion to an inner side of the tape winding spatula part.

It is preferred that a thickness of a part of the elastic deformation portion where the thick walled portion is formed, is larger than a thickness of a remaining part of the elastic deformation portion where the thick walled portion is not formed.

It is preferred that a lubricant is applied to an outer surface of the elastic deformation portion.

According to an embodiment, there is provided a grommet including: a tapered barrel part including a large diameter cylindrical portion, a small diameter cylindrical portion, and an elastic deformation portion disposed between the large diameter cylindrical portion and the small diameter cylindrical portion; wherein a fitting groove to be fitted in a through hole of a panel, is formed on the large diameter cylindrical portion; and a pair of tape winding spatula parts connected to the small diameter cylindrical portion and holding a wire harness passed through therein, wherein the tape winding spatula parts face each other and are integrally formed on the small diameter cylindrical portion so as to protrude from the small diameter cylindrical portion to be inserted in the through hole of the panel, and wherein a thick walled portion is formed on an inner side of each tape winding spatula part, an inner side of a part of the small diameter cylindrical portion connected to the each tape winding spatula, and an inner side of a part of the elastic deformation portion connected to the part of the small diameter cylindrical portion.

According to the embodiment, it is possible to provide a grommet which can be easily inserted by suppressing elongation of an elastic deformation part when the grommet is inserted into a through hole of a panel to be mounted to the panel, and can improve a holding force by suppressing deformation of the elastic deformation part after the grommet is mounted to the panel.

BRIEF DESCRIPTION OF THE DRAWINGS

FIG. 3A is a table of test data of an insertion force and a holding force of the grommet.

FIG. 3B is a table of test data of an insertion force and a holding force of a grommet according to a comparative example in which the grommet has no thick walled portion therein.

DETAILED DESCRIPTION

A grommet according to an exemplary embodiment will be described in detail below with reference to drawings.

Figure 1:
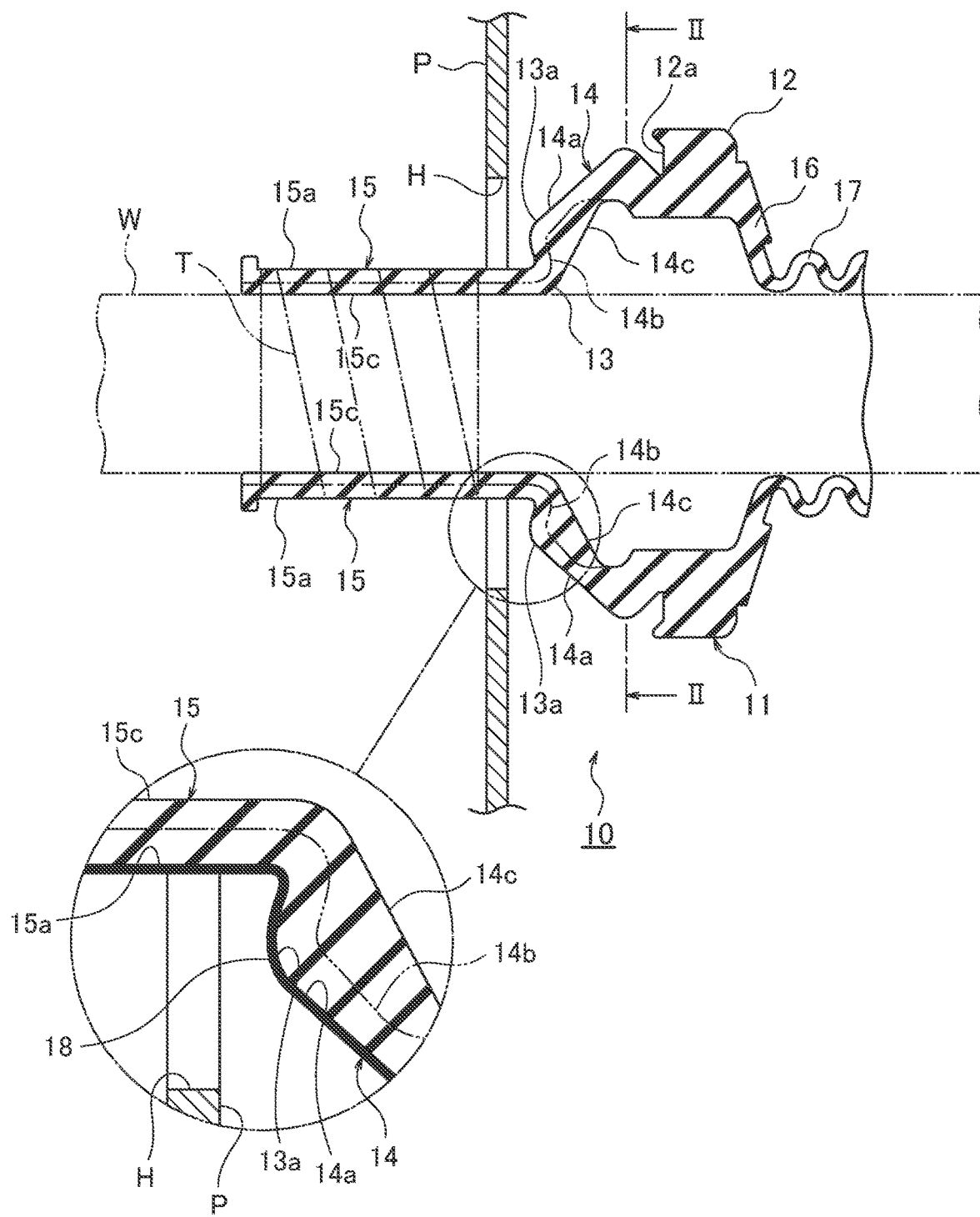
FIG. 1 is a cross-sectional view of a grommet according to an embodiment of the disclosure before the grommet is mounted to a vehicle.
Figure 2:
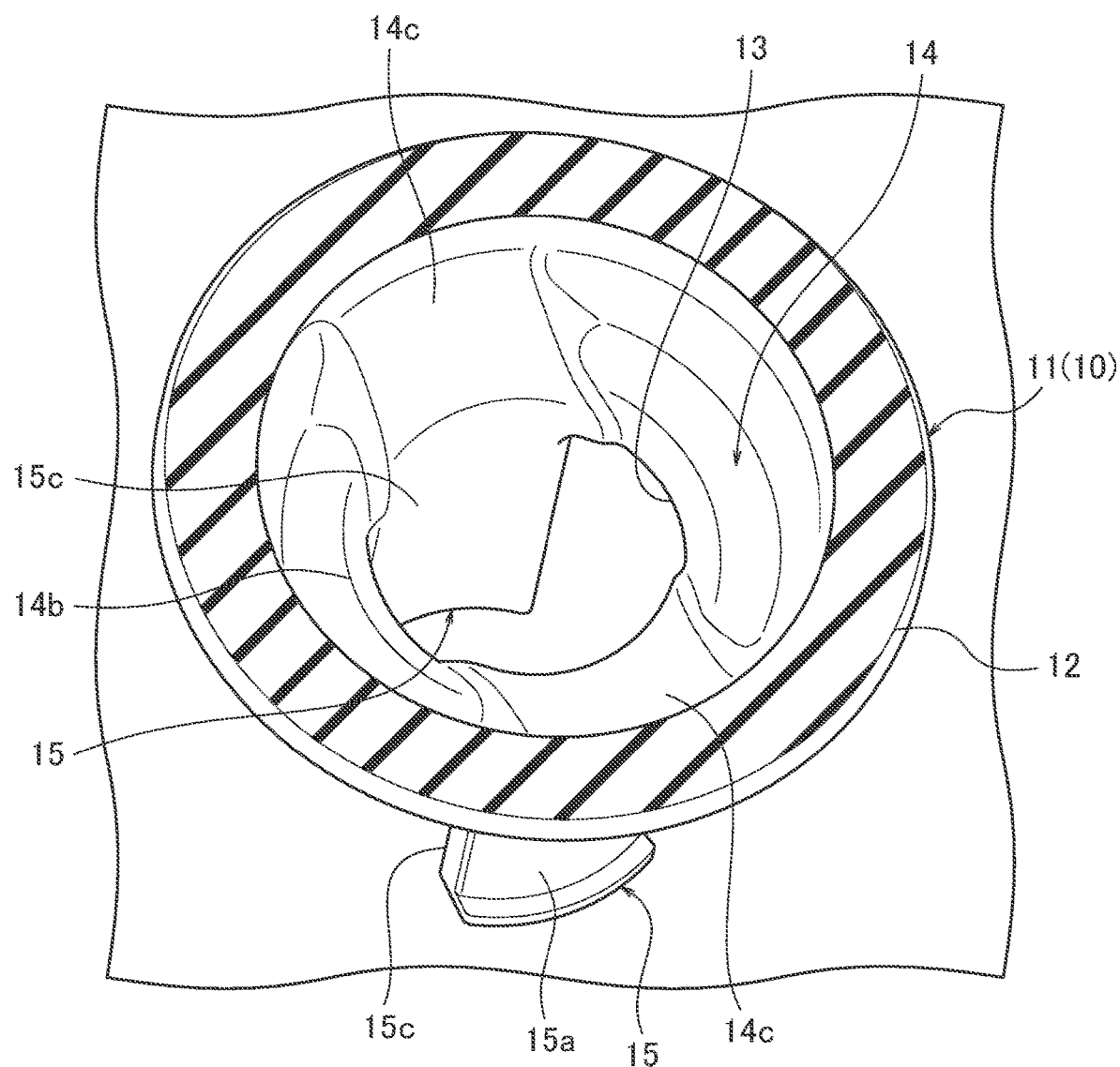
FIG. 2 is a perspective view of the grommet viewed from a cross-section surface taken along a line II-II in FIG. 1.

As illustrated in FIG. 1 and FIG. 2, a grommet 10 is made of an elastic synthetic rubber, an elastomer, or the like. The grommet 10 includes a tapered barrel part 11, a pair of tape winding spatula parts 15, 15, an elastic deformation part 16 and a bellows tube part 17. The grommet 10 is fitted in a circular through hole H of a panel P of a vehicle to be mounted the panel P.

The tapered barrel part 11 includes a large diameter cylindrical portion 12, a small diameter cylindrical portion 13 and an elastic deformation portion 14. The large diameter cylindrical portion 12 has a fitting groove 12a at a side where the elastic deformation portion 14 is located. In a state where the grommet 10 is mounted to the panel P, a periphery edge of the through hole H of the panel P is fitted in the fitting groove 12a of the large diameter cylindrical portion 12. The elastic deformation portion 14 can elastically deform and is disposed between the large diameter cylindrical portion 12 and the small diameter cylindrical portion 13. A wire harness W is inserted in the large diameter cylindrical portion 12, the small diameter cylindrical portion 13 and the elastic deformation portion 14.

The pair of tape winding spatula parts 15, 15 is connected to the small diameter cylindrical portion 13 of the tapered barrel part 11. The tape winding spatula parts 15, 15 hold the wire harness W inserted therebetween. The elastic deformation part 16 is connected to the large diameter cylindrical portion 12 at a side of the large diameter cylindrical portion 12 opposite to the side where the elastic deformation portion 14 is located. The bellows tube part 17 is connected to the elastic deformation part 16. The wire harness W is inserted in the elastic deformation part 16 and the bellows tube part 17.

An outer diameter of the large diameter cylindrical portion 12 is larger than outer diameters of the small diameter cylindrical portion 13 and the bellows tube part 17. An outer diameter of the elastic deformation portion 14 gradually increases from the small diameter cylindrical portion 13 to the large diameter cylindrical portion 12. An outer diameter of the elastic deformation part 16 gradually decreases from the large diameter cylindrical portion 12 to the bellows tube part 17.

As illustrated in FIG. 1 and FIG. 2, the large diameter cylindrical portion 12 of the tapered barrel part 11 is formed in a thick annular cylindrical shape. The small diameter cylindrical portion 13 of the tapered barrel part 11 is formed in a thin and short cylindrical shape. The elastic deformation portion 14 of the tapered barrel part 11 is thinner than the large diameter cylindrical portion 12. An outer surface 14a of the elastic deformation portion 14 is formed in a conical surface shape.

As illustrated in FIG. 1 and FIG. 2, the pair of tape winding spatula parts 15, 15 is integrally formed on the small diameter cylindrical portion 13 so as to protrude from the small diameter cylindrical portion 13. The tape winding spatula parts 15, 15 face each other. The tape winding spatula parts 15, 15 can be inserted into the through hole H of the panel P, from positions facing each other in a vertical direction on the small diameter cylindrical portion 13.

A thick walled portion 15c is integrally formed on an inner side of each of the tape winding spatula parts 15, 15 and an inner side of a part of the small diameter cylindrical portion 13 connected to each of the tape winding spatula parts 15, 15. A thick walled portion 14c is integrally formed on an inner surface 14b of a part of the elastic deformation portion 14 connected to each of the tape winding spatula parts 15, 15 via the part of the small diameter cylindrical portion 13. Namely, the thick walled portions 14c, 15c are continuously and integrally formed from an inner side of the elastic deformation portion 14 to the inner side of each of the tape winding spatula parts 15, 15.

As illustrated in FIG. 2, due to thick walled portions 14c, 14c and thick walled portions 15c, 15c, thicknesses of parts of the elastic deformation portion 14 where the thick walled portions 14c, 14c are formed, and thicknesses of the tape winding spatula parts 15, 15 are larger than a thickness of a remaining part of the elastic deformation portion 14 where the thick walled portions 14c, 14c are not formed. Thus, an insertion force and a holding force of the grommet 10 can be given a degree of freedom.

As illustrated in FIG. 1, when the grommet 10 is mounted in the through hole H of the panel P, the outer surface 14a of the elastic deformation portion 14, outer surfaces 13a, 13a of the small diameter cylindrical portion 13 and outer surfaces 15a, 15a of the tape winding spatula parts 15, 15 are coated with a lubricant 18. The wire harness W inserted between the tape winding spatula parts 15, 15 is held between the tape winding spatula parts 15, 15 and fixed to the tape winding spatula parts 15, 15, by winding the adhesive tape T around the tape winding spatula parts 15, 15.

Then, by inserting the tape winding spatula parts 15, 15 around which the adhesive tape T is wound through the through hole H of the panel P, and then pulling the tape winding spatula parts 15, 15, the peripheral edge of the through hole H is fitted and locked in the annular fitting groove 12a of the large diameter cylindrical portion 12 of the tapered barrel part 11.

As illustrated in FIG. 1, the wire harness W is inserted in the bellows tube part 17 as a small diameter tube part, to be protected by the bellows tube part 17.

As described above, according to the grommet 10, when the grommet 10 is inserted in the through hole H of the panel P to be mounted to the panel P, the peripheral edge of the through hole H is fitted in the fitting groove 12a of the large diameter cylindrical portion 12 of the tapered barrel part 11, by pulling the tape winding spatula parts 15, 15 around which the adhesive tape T is wound. In this insertion work, elongation of the elastic deformation portion 14 and the tape winding spatula parts 15, 15 is suppressed by the thick walled portions 14c, 14c and the thick walled portions 15c, 15c integrally formed from the inner side of the elastic deformation portion 14 to the inner sides of the tape winding spatula parts 15, 15. This allows easy insertion of the grommet 10.

More specifically, when the tape winding spatula parts 15, 15 are pulling, the elastic deformation portion 14 is also pulled. However, the elongation from the elastic deformation portion 14 to the tape winding spatula parts 15, 15 is suppressed due to the thick walled portions 14c, 14c and the thick walled portions 15c, 15c when the grommet 10 is inserted in the through hole H of the panel P to be mounted to the panel P. This allows easy insertion of the grommet 10. Namely, by reinforcing the inner side of the elastic deformation portion 14 and the inner sides of the tape winding spatula portions 15, 15, which are portions where the elongation is likely to occur, with the thick walled portions 14c, 14c and the thick walled portions 15c, 15c, contraction forces of the elastic deformation portion 14 and the tape winding spatula portions 15, 15 are improved, as shown by comparison data in FIG. 3A and FIG. 3B.

Since the contraction forces of the elastic deformation portion 14 and the tape winding spatula parts 15, 15 are improved, a tensile force when pulling the tape winding spatula parts 15, 15 toward the through hole H side of the panel P is sufficiently transmitted. This reduces an insertion force into the through hole H. In particular, the lubricant 18 applied to the outer surface 14a of the elastic deformation portion 14 facilitates the insertion of the grommet 10 into the through hole H of the panel P. Thus, since the insertion force of the grommet 10 is reduced when the grommet 10 is being inserted into the through hole H of the panel P, a mounting work of the grommet 10 is facilitated. In addition, after the grommet 10 is mounted to the panel P, a deformation of the elastic deformation portion 14 of the grommet 10 is suppressed by the thick walled portions 14c, 14c and the thick walled portions 15c, 15c which are integrally formed from the inner side of the elastic deformation portion 14 to the inner sides of the tape winding spatula parts 15, 15. This improves a holding force.

Although this embodiment has been described above, this embodiment is not limited to the above, and various variations are possible within the gist of the present embodiment.

According to this embodiment, although the tape winding spatula parts 15, 15 are formed on the small diameter cylindrical portion 13 at the positions facing each other in the vertical direction, the tape winding spatula parts 15, 15 may be formed on the small diameter cylindrical portion 13 at positions facing each other in a horizontal direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A grommet comprising:
   a tapered barrel part including a large diameter cylindrical portion, a small diameter cylindrical portion, and an elastic deformation portion disposed between the large diameter cylindrical portion and the small diameter cylindrical portion;
      wherein a fitting groove to be fitted in a through hole of a panel, is formed on the large diameter cylindrical portion, and
      wherein a thick walled portion is formed on an inner side of the elastic deformation portion; and
   a tape winding spatula part connected to the small diameter cylindrical portion and holding a wire harness passed through therein,
   wherein the thick walled portion is formed from, and on, the inner side of the elastic deformation portion to, and on, an inner side of the tape winding spatula part, and
   wherein, with respect to the elastic deformation portion, the thick walled portion is formed on only a partial portion of a circumference of the inner side of the elastic deformation part, such that a thickness of a part of the elastic deformation part that includes a remaining portion of the circumference is thinner than a part of the elastic deformation portion that includes the thick walled portion.

2. The grommet according to claim 1, wherein a lubricant is applied to an outer surface of the elastic deformation portion.

3. A grommet comprising:
   a tapered barrel part including a large diameter cylindrical portion, a small diameter cylindrical portion, and an elastic deformation portion disposed between the large diameter cylindrical portion and the small diameter cylindrical portion;
      wherein a fitting groove to be fitted in a through hole of a panel, is formed on the large diameter cylindrical portion; and
   a pair of tape winding spatula parts connected to the small diameter cylindrical portion and holding a wire harness passed through therein,
      wherein the tape winding spatula parts face each other and are integrally formed on the small diameter cylindrical portion so as to protrude from the small diameter cylindrical portion to be inserted in the through hole of the panel, and
      wherein a thick walled portion is formed on an inner side of each tape winding spatula part, an inner side of a part of the small diameter cylindrical portion connected to the each tape winding spatula, and an inner side of a part of the elastic deformation portion connected to the part of the small diameter cylindrical portion,
   wherein, with respect to the elastic deformation portion, the thick walled portion is formed on only a partial portion of a circumference of the inner side of the elastic deformation part, such that a thickness of a part of the elastic deformation part that includes a remaining portion of the circumference is thinner than the part of the elastic deformation portion that includes the thick walled portion.

\* \* \* \* \*